United States Patent
Wu et al.

(10) Patent No.: US 10,051,795 B2
(45) Date of Patent: Aug. 21, 2018

(54) STAGGER STACKED FLOWERPOT AND STEREO GREENING WALL SPACE FORMED BY COMBINING OF FLOWERPOTS IN STAGGER STACKED MODE

(71) Applicant: SHANGHAI WORTH GARDEN PRODUCTS CO., LTD., Shanghai (CN)

(72) Inventors: Yunchong Wu, Shanghai (CN); Junhua Fei, Shanghai (CN)

(73) Assignee: SHANGHAI WORTH GARDEN PRODUCTS CO., LTD., Shanghai (CN)

( * ) Notice: Subject to any disclaimer, the term of this patent is extended or adjusted under 35 U.S.C. 154(b) by 176 days.

(21) Appl. No.: 14/900,943

(22) PCT Filed: Feb. 4, 2015

(86) PCT No.: PCT/CN2015/072218
§ 371 (c)(1),
(2) Date: Dec. 22, 2015

(87) PCT Pub. No.: WO2016/050026
PCT Pub. Date: Apr. 7, 2016

(65) Prior Publication Data
US 2016/0366836 A1    Dec. 22, 2016

(30) Foreign Application Priority Data

Sep. 29, 2014 (CN) .......................... 2014 1 0513850

(51) Int. Cl.
*A01G 9/02* (2018.01)

(52) U.S. Cl.
CPC ............. *A01G 9/023* (2013.01); *A01G 9/024* (2013.01); *A01G 9/025* (2013.01)

(58) Field of Classification Search
CPC ........ A01G 9/023; A01G 9/022; A01G 9/025; A01G 9/02
See application file for complete search history.

(56) References Cited

U.S. PATENT DOCUMENTS

| 6,247,266 B1* | 6/2001 | Borgen | A01G 27/00 |
| | | | 47/58.1 R |
| 9,271,452 B2* | 3/2016 | Sung | A01G 9/025 |
| 2009/0000189 A1* | 1/2009 | Black | A01G 27/02 |
| | | | 47/82 |

(Continued)

*Primary Examiner* — Monica L Williams
(74) *Attorney, Agent, or Firm* — Kile Park Reed & Houtteman PLLC

(57) ABSTRACT

The invention discloses a stagger stacked flowerpot, which is characterized in that: the stagger stacked flowerpot is comprised of a flowerpot body, in which a soil baffle is provided to divide the flowerpot body into a plant and compost space and a water storage space; the soil baffle is provided with a water groove, which effectively separates the irrigated water from the soil. The invention has the advantages as simple structure, preferable rigidity, security, stability, reliability, convenient plantation, low construction and maintenance cost, fast irrigation and easy control thereof, and water-soil separation, and is suitable for building masonry walls, commercial spaces, residences and so on.

5 Claims, 8 Drawing Sheets

(56) References Cited

U.S. PATENT DOCUMENTS

| | | | |
|---|---|---|---|
| 2010/0229464 A1* | 9/2010 | Wilkes | A01G 9/023 47/82 |
| 2011/0258925 A1* | 10/2011 | Baker | A01G 9/023 47/65.8 |
| 2012/0180388 A1* | 7/2012 | Friedman | A01G 9/025 47/83 |
| 2015/0096229 A1* | 4/2015 | Chang | A01G 27/005 47/82 |

* cited by examiner

STAGGER STACKED FLOWERPOT AND STEREO GREENING WALL SPACE FORMED BY COMBINING OF FLOWERPOTS IN STAGGER STACKED MODE

TECHNICAL FIELD

This invention relates to a kind of flowerpot and the stereo greening wall space formed by combining of flowerpots in the stagger stacked mode and belongs to the gardening and horticulture greening technology.

BACKGROUND ART

Along with the development of human society, industrialized and mass production gives rise to rapid urban extension and urban population growth, so the average environmental greening proportion per capita decreases and the contradiction between residential and green spaces becomes eminent increasingly. In order to effectively increase urban greening area, the flowerpot greening in the limited spaces of the residence is unable to meet the requirement to improve urban greening rate per capita. At the beginning of the $21^{st}$ century, the people proposed stereo plantation, of which flowers or plants are planted in the specially designed flowerpots or containers on the walls of the buildings to form a stereo greening and plantation technique by right of the stacking of the buildings or containers.

At present, the flowerpots or containers are used for stereo greening on the market. The trickle irrigation is adopted for the stereo plantation. As the stereo plantation is different from planar plantation, the clogged irrigator should be replaced inconveniently with climbing operation; direct irrigation not only wastes water resources, but also is uneasy to control sprinkling water quantity; it is inconvenient to replace the plants in the containers; the stereo plantation, of which the cultivation bags are inserted in the flowerpots or containers, may fall off easily, causing some safety problems. So, stereo greening requires a stereo flowerpot or container, which is beautiful in appearance and combined forms and easy in irrigation, can save water resource, is convenient to replace plants and is secure and reliable.

CONTENTS OF THE INVENTION

The invention is to provide a secure stereo greening flowerpot, which can be stacked and combined together to form beautiful appearance and shapes, overcome blockage of trickle irrigator, easily achieve irrigation and control irrigation water volume, replace the plants conveniently, prevent the plants from falling off and reduce plant maintenance cost.

In order to achieve the above objectives, the invention discloses a technical scheme of a stagger stacked flowerpot comprising a flowerpot body, which is provided with at least one cavity used to hold a seedling pot or a soil baffle, wherein: a water storage space is arranged at the bottom of the cavity, a drain hole with an upward opening is set at the bottom of the flowerpot body, the height of the drain hole corresponds to the maximum water level in the water storage space. The water overflowed from the drain hole of the water storage space flows into the water storage space of the lower body below the current flowerpot body, and the bottom hole of the seedling pot or the pervious hole of the soil baffle in the cavity is lower than the drain hole in level positions; a bracing edge and a bracing position are provided at the top of the flowerpot body, a snap groove is arranged at the bottom of the flowerpot body, the bracing edge and bracing position of the current flowerpot body are clamped into the snap groove the upper body, so that the flowerpot bodies of two adjacent layers are combined in a stagger stacking mode.

Preferably, a front bracing and a rear bracing are arranged in the cavity and used to brace the seedling pot or soil baffle.

Preferably, a rear bracing sleeve is provided at the bottom of the soil baffle and sleeved on the rear bracing.

Preferably, the top part of the cavity leans out with the dip angle of α, so that the barycenter P of the seedling pot in the cavity seedling pot is within the range of the bottom diameter of the seedling pot.

Preferably, a hanging hole is set at the back of the flowerpot body 1.

Preferably, the peripheral wall of the rear bracing sleeve arranged in the cavity fits to the inner wall of the cavity, the back wall of the rear bracing sleeve partially warps up, and the upwarped part and the inner wall of the cavity jointly form a water groove, through which water flows into the water storage space.

Preferably, at least two cavities are provided and mutually connected.

Preferably, the height of the drain hole is adjustable.

Preferably, two or more stagger stacked flowerpots are provided and vertically divided into two layers; for two adjacent layers of stagger stacked flowerpots, the bracing edges and bracing positions of the stagger stacked flowerpots in the lower layer are snapped into the snap grooves of the stagger stacked flowerpots in the upper layer, so that the stagger stacked flowerpots of the adjacent two layers are combined in the stagger stacking mode.

Preferably, a water-distributing pipe is also provided and connected with an effluent adjusting cock, which is located above the top layer of stagger stacked flowerpots, water from the effluent adjusting cock enters the water storage space of the lower stagger stacked flowerpots and then flows along the drain hole into the water storage spaces of all stagger stacked flowerpots gradually from top to bottom.

In the invention, the flowerpot bodies are combined in a stagger stacking mode and hung to the hooks on the walls via the hanging holes. Snap grooves are provided at the bottoms of the flowerpot bodies. When the flowerpot bodies are stacked in a stagger mode, the snap grooves of the lower layers clamp some partial edges of the upper part of the flowerpot body, so that the flowerpots form a one-piece body to improve integral rigidity of the flowerpots. The flowerpot body is comprised of various cambered surfaces, in which small flowerpots can be placed and can be inclined so that the plants can gain more sunlight and growth spaces. Moreover, the soil baffle can be used to divide the flowerpot into a soil space and a water storage space. The water storage space is in concave form at the bottom of the flowerpot. When water flows to the bottom of the flowerpot, the water level can be set and the height of the water pipe can be adjusted according to the water demand of the plants, to ensure that a part of the flowerpot bottom can contact with water, and excessive water overflows out of the pipe and flows into the water storage spaces of the flowerpots in the lower layer. By analogy, the forms of the flowerpot bodies are comprised of various inward cambered surfaces, which can hold small flowerpots, the barycenters of small flowerpots stacked in the whole body are inward, the inner sides of the flowerpots are shielded off by the stagger-stacked flowerpots above, so that the flowerpots may not fall off due to high wind to meet the safety requirements for the product.

Drainage is done by overflowing, of which water flows slowly to precipitate soil and reduce the loss of the soil. Water is irrigated via the water-distributing pipe directly into the water storage space from the top layer of flowerpots, so that the stereo flowerpots of the lower layers can obtain sufficient water quickly. Meanwhile, the invention also solves the difficulty that the clogged irrigator of the trickle irrigation system cannot be replaced conveniently in the stereo plantation.

The invention has such advantages as simple structure, reliability and security, timely and convenient irrigation and low maintenance cost, and the plantation modes include direct arrangement of seedling pots or filling of compost. Moreover, the invention is applicable for stereo greening in building masonry walls, commercial spaces, families and the like.

The invention also has the following advantages:

1. The bracing point is provided in the flowerpot body to brace the seedling pot, so that the plantation can be accomplished by direct insertion;

2. The soil baffle divides the flowerpot body into the plant and compost space and the water storage space to prolong the irrigation period;

3. The water flow and soil are effectively separated in the flowerpot to effectively conserve the soil;

4. The snap groove is provided at the bottom of the flowerpot, so that the flowerpots can be combined in a stagger stacking mode, to form various shapes of wall space and improve the rigidity of greening walls after the stacking;

5. The combined flowerpots have the vertical automatic watering function and water irrigated in the top flowerpots may overflows the water level through the drain holes and flows down to the flowerpots of the lower layer, until the whole greening wall space is watered, of which the building and maintenance costs are lower and the watering speed is quicker than those of the trickle irrigation;

6. The height of the drain pipe can be adjusted to adjust the water level of self-irrigation and to adapt to different plants;

7. The form of the flowerpot body is comprised of various inclined cambered surfaces, which can hold small flowerpots, the barycenters of the small flowerpots set in the stacked flowerpot body are inward, the inner sides of the flowerpots are shielded off by the stagger stacked flowerpots stacked above, so that the flowerpots may not fall off due to high wind, which meets the safety requirement for the product.

BRIEF DESCRIPTION OF ATTACHED DRAWINGS

In the figures, 1—flowerpot body; 2—soil baffle; 3—hanging hole; 4—front bracing; 5—rear bracing; 6—drain hole; 7—seedling pot; 8—flowing direction; 9—snap groove; 10—top bracing edge; 11—bracing position; 12—water groove; 13—locking port; 14—post-irrigation water level; 15—water-level control tube; 16—water storage space; 17—rear bracing sleeve; 18—pervious hole; 19—bottom hole; 20—water-distributing pipe; 21—effluent adjusting cock; 22—seedling pot blocking position.

Embodiments

The preferable embodiments and relevant figures are provided in the following to make the invention more distinct and understandable.

Figure 1A:
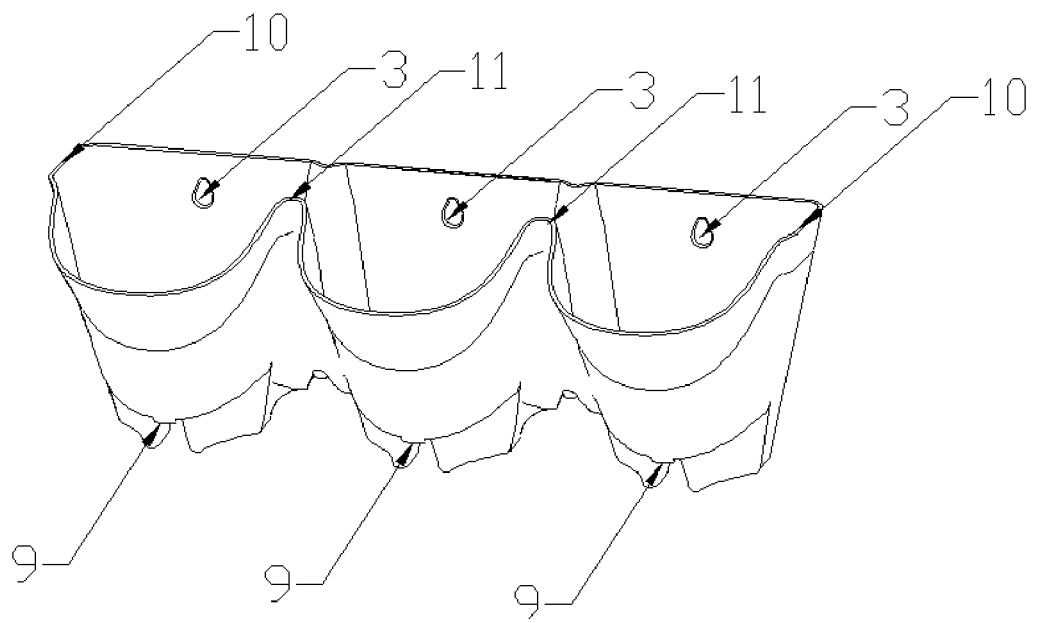
FIG. 1A is a stereo diagram for body of the stagger stacked flowerpot.
Figure 1B:
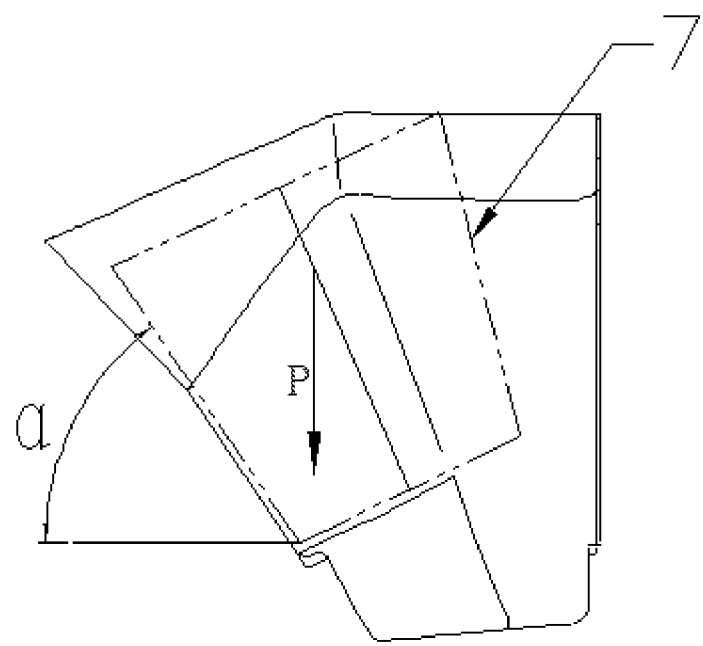
FIG. 1B is the flowerpot side view of the stagger stacked flowerpot.

The invention refers to a stagger stacked flowerpot as shown in FIG. 1A and FIG. 1B, the stereo diagrams of the stagger stacked flowerpots. The invention comprises a flowerpot body 1 composed of three cavities, which are mutually connected and used to hold the seedling pot 7 or the soil baffle 2. The top part of each cavity leans out with the dip angle of α, to ensure that the plant may grow outwards to gain more space and sunlight and the seedling pot 7 is not blown down by the wind, for the barycenter P of the seedling pot 7 in the cavity is within the range of the bottom diameter of the seedling pot 7. A hanging hole 3 is arranged on the back of the flowerpot body 1 and can be used to mount the flowerpot body onto the back wall or grid frame conveniently. A snap groove 9 is provided at the bottom of the flowerpot body 1 and a top bracing edge 10 and a bracing position 11 are arranged at the top of the flowerpot body and can be mutually locked when the flowerpots are stacked, to improve the integral rigidity of the greening wall space.

Figure 2:
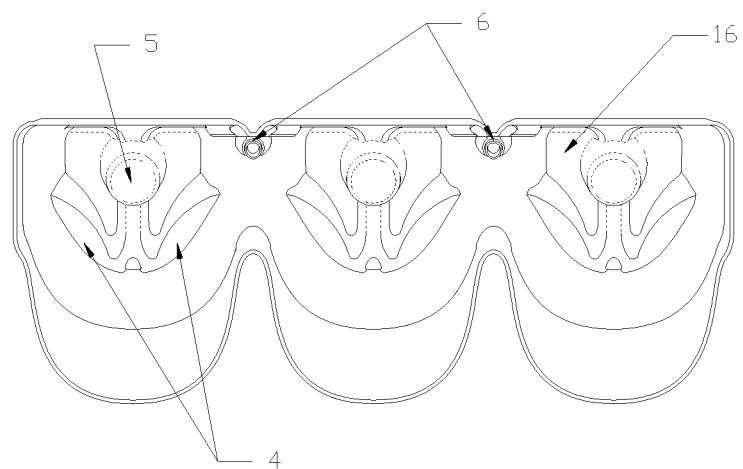
FIG. 2 is the top view of the body of the stagger stacked flowerpot.

FIG. 2 presents a top view of the body of the stagger stacked flowerpots. The front bracing 4 and rear bracing 5 are provided in the flowerpot body 1 and used to hold the soil baffle 2 or seedling pot 7, which form the water storage spaces 16 with the bottom cavities of the flowerpot body 1 and are connected with each other. The drain hole 6 with the opening upward is provided in the flowerpot body 1. When the water in the water storage space 16 rises to the level of the opening of the drain hole 6, excess water may flow through the drain hole 6 down to the flowerpots of the lower layer.

Figure 3:
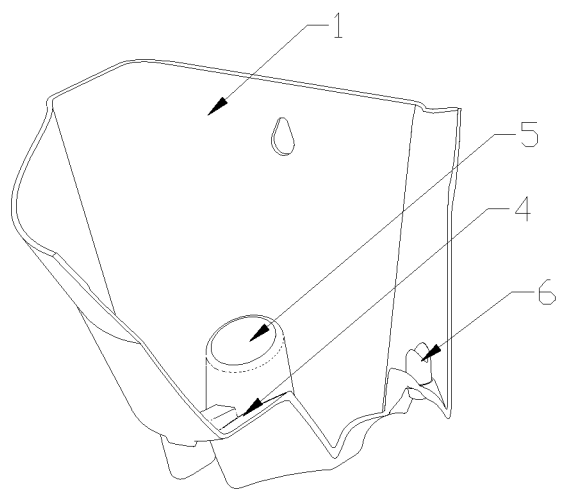
FIG. 3 is the broken-out section view of the stagger stacked flowerpots.

FIG. 3 is a partial sectional stereogram for the stagger stacked flowerpot, of which the water storage space 16 is lower than and connected with the drain hole 6.

Figure 4:
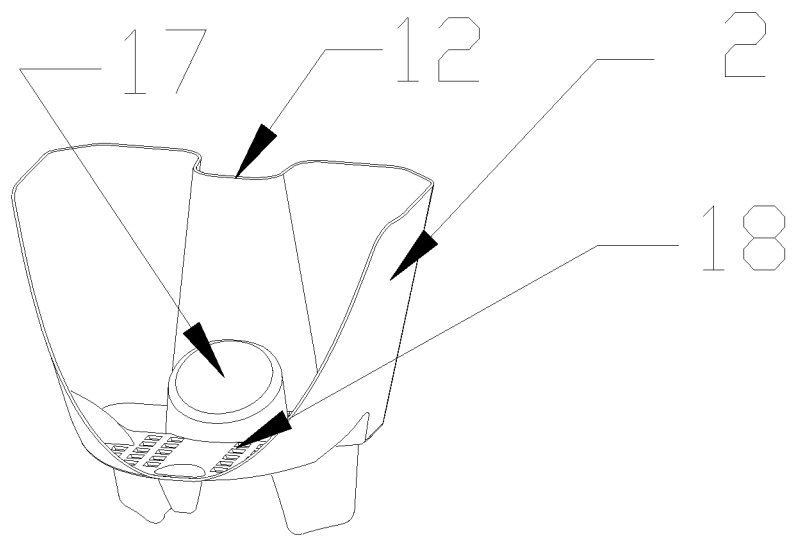
FIG. 4 is the schematic diagram for soil baffle of the stagger stacked flowerpot.

FIG. 4 is the diagram for the soil baffle 1 of the stagger stacked flowerpot. The soil baffle 2 is dimensionally identical to the inner cavity of the flowerpot body 1 and the water groove 12 is provided so that the overflowing water from the top layer does not directly fall onto the soil, so that the survival rate of the plants can be improved and soil loss is reduced. In addition, the rear bracing sleeve 17 and pervious hole 18 are provided to ensure that some water of the water storage space 16 seeps through the soil.

Figure 5:
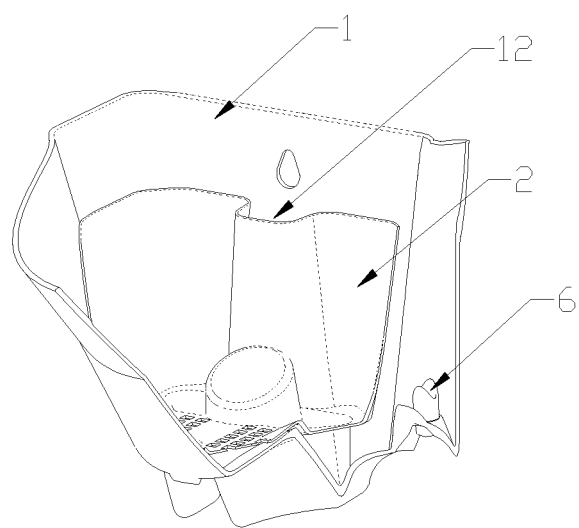
FIG. 5 is the assembly diagram for soil baffle of the stagger stacked flowerpot.

FIG. 5 is a partial sectional stereogram after the assembly of the stagger-stacked flowerpot body and the soil baffle. The rear bracing sleeve 17 is sleeved into the rear bracing 5, the horizontal position of the pervious hole 18 is lower than the drain hole 6, and the edges of the pervious hole 18 contact with the front bracing 4.

Figure 6:
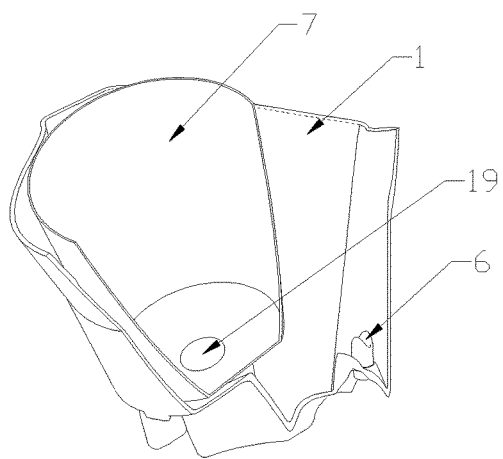
FIG. 6 is the assembly diagram for the seedling pot directly used for the stagger stacked flowerpot.

FIG. 6 is the diagram for the seedling pot used for a stagger stacked flowerpot. The bottom of the seedling pot 7 contacts with the rear bracing 5 and the front bracing 4, and the level position of the bottom hole 9 of the seedling pot 7 is lower than the drain hole 6, so that water of the water storage space seeps through the soil.

Figure 7A:
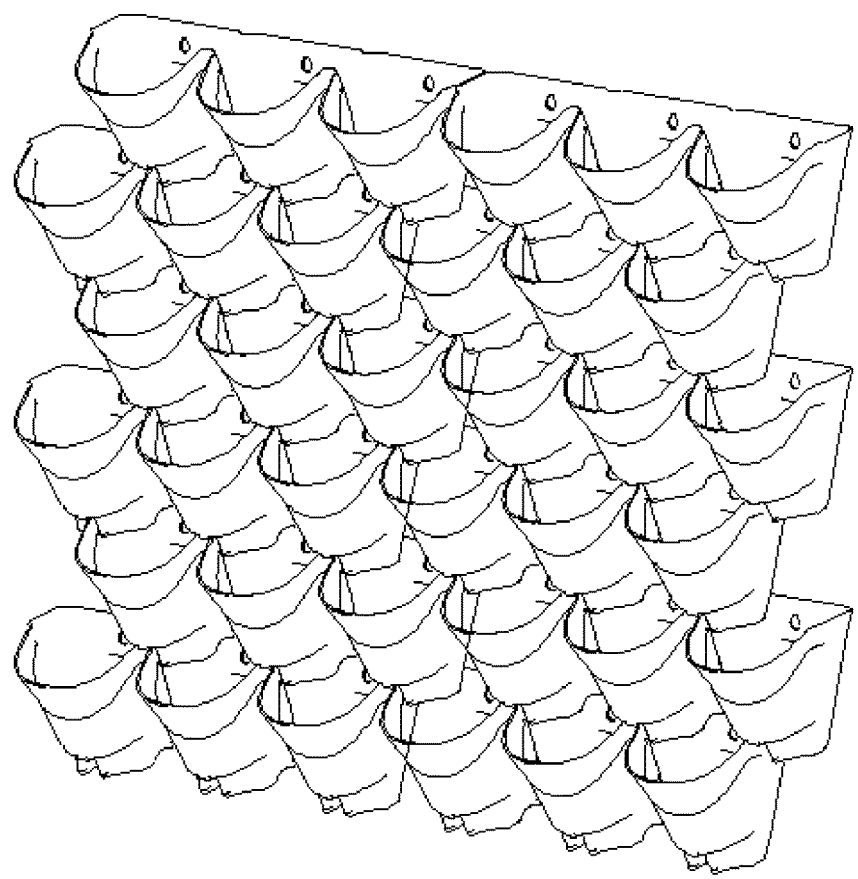
FIG. 7A is the assembly diagram for the stereo greening wall space stacked by the stagger stacked flowerpots.
Figure 7B:
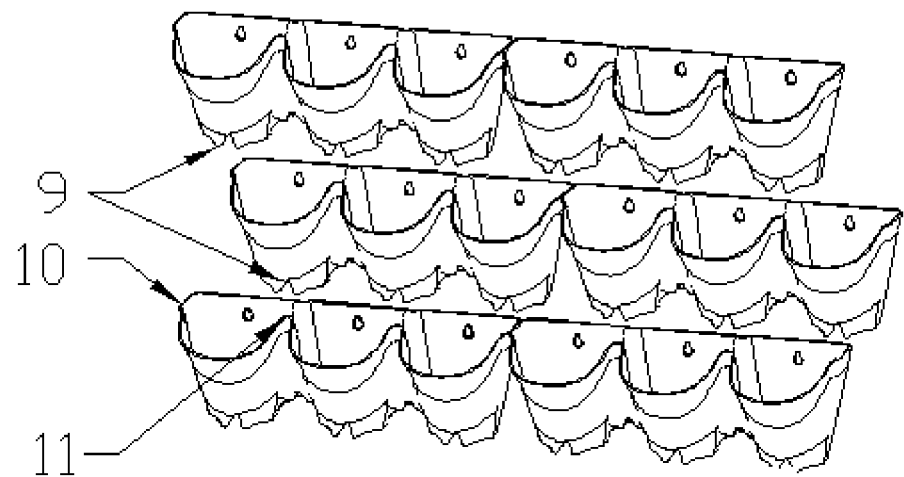
FIG. 7B is the partial diagram of FIG. 7A.

FIG. 7 is an assembly diagram for the stereo greening wall space stacked with stagger stacked flowerpots. The flowerpot bodies 1 can be stacked and combined to form a stereo greening wall space, which is comprised of two or more vertically stacked flowerpot bodies 1. After vertical stagger stacking, the snap groove 9 at the bottom of the upper flowerpot body 1 is firmly snapped to and mutually connected with the bracing edge 10 and bracing position 11 at the top of the lower flowerpot body 1 to improve integral rigidity of the stereo greening wall space.

Figure 8:
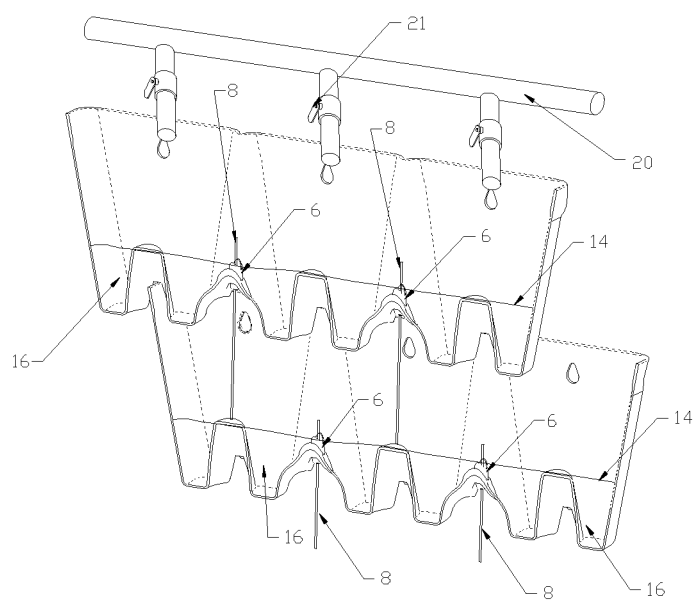
FIG. 8 is the diagram for the irrigation flowing direction after stacking of the stagger stacked flowerpots.

FIG. 8 is the diagram for the irrigation flowing direction after stacking of a stagger stacked flowerpot. After the flowerpot bodies 1 are combined to form a greening wall, the water-distributing pipe 20 is mounted on the top layer of the flowerpots and connected with the effluent adjusting cock 21. When the soil baffle 2 is used, the flowing direction 8 may continue along the water groove 12 to the water storage space 16 at the bottom of the flowerpot body 1; when the seedling pot 7 is used, the flowing direction 8 may go along the outer wall of the seedling pot into the water storage space 16 at the bottom of the flowerpot body 1. After the post-irrigation water level 14 is up to the level of the drain hole 6, water may flow along the drain hole 6 into the flowerpot body 1 of the lower layer, until the bottom layer is irrigated by analogy. The irrigation method is bottom self-absorbing and overcomes easy clogging of the trickle irrigator and high construction and maintenance costs encountered by the trickle irrigation method.

Figure 9:
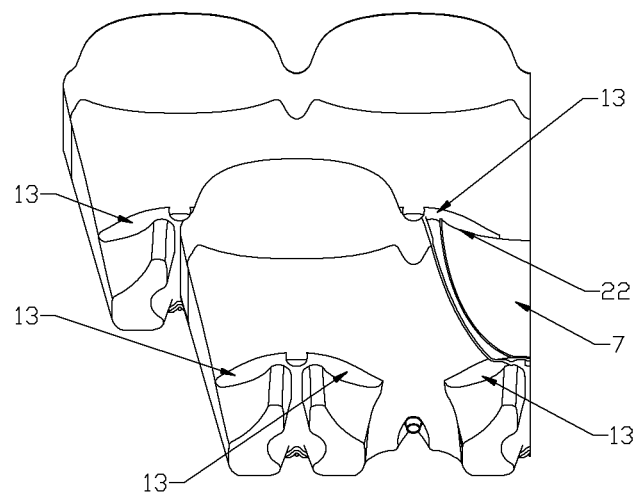
FIG. 9 is the bottom structure diagram after stacking of the stagger stacked flowerpots.

FIG. 9 is the bottom structure diagram after stacking of a stagger stacked flowerpot. When the seedling pot after stacking is directly used for plantation, the locking ports 13 of the upper flowerpots are used to clamp the blocking position 22 of the seedling pot 7, so that the seedling pot cannot escape outwards naturally, to largely improve the security of external wall plantation of high-rise buildings.

Figure 10:
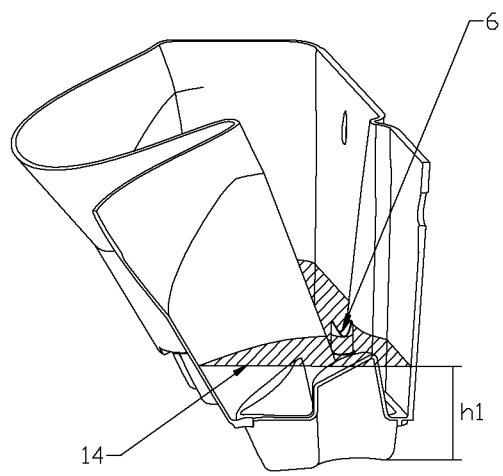
FIG. 10 is the direct water level diagram after stacking of the stagger stacked flowerpots.

FIG. 10 is the diagram for water level of direct utilization of a stagger stacked flowerpot stacked. When the stagger stacked flowerpots are used directly after stacking, the post-irrigation water level 14 can rise to the height h1 of the drain hole 6 and is suitable to plant the plants requiring less water.

Figure 11A:
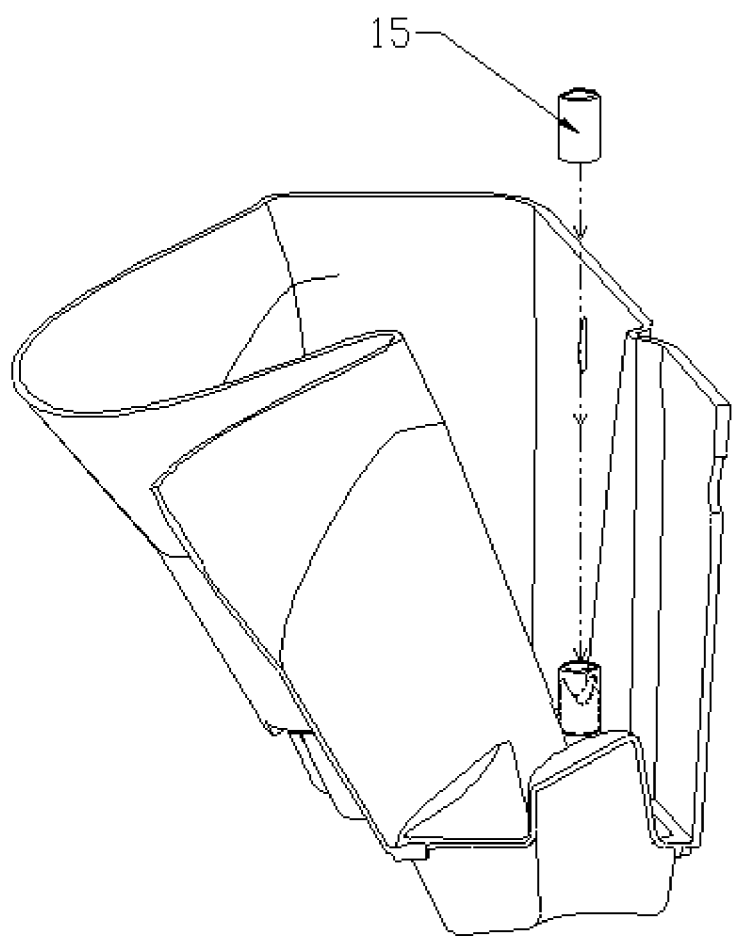
FIG. 11A is the adjustable water level diagram after stacking of the stagger stacked flowerpots.
Figure 11B:
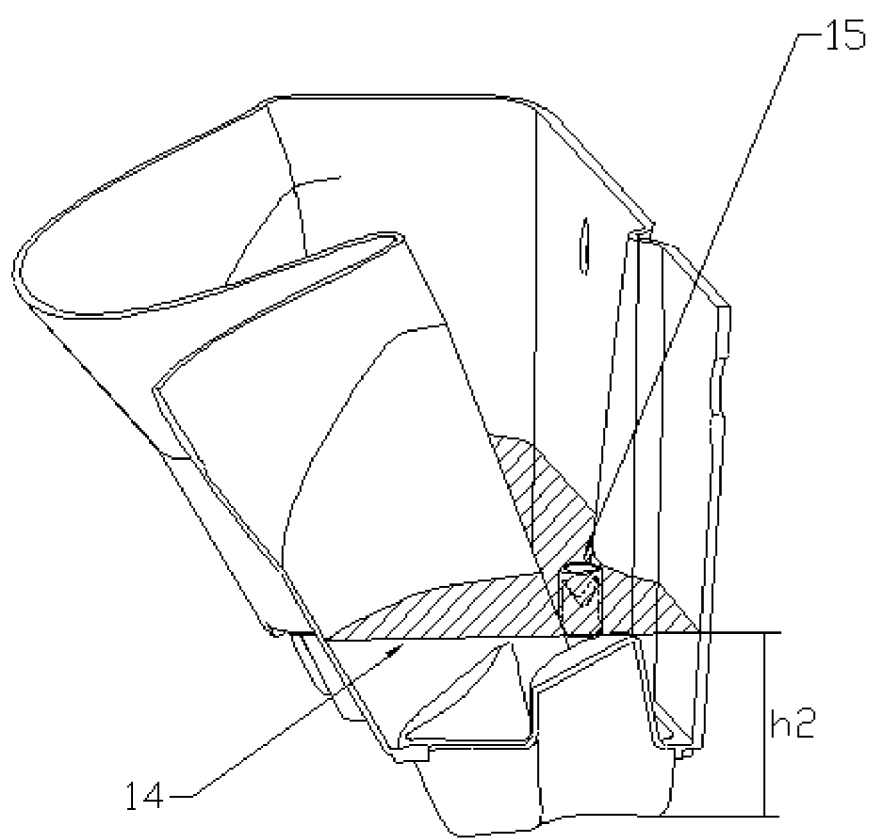
FIG. 11B is the sectional view of FIG. 11A.

FIG. 11A and FIG. 11B are the adjustable water level diagram after stacking of the stagger stacked flowerpots. When the plants require more water, the water-level control tube 15 can be sleeved to the drain hole 6 as per relevant height, the post-irrigation water level 14 can reach the height h2 (greater than h1) of the adjustable water pipe 14, so that the storage water level is advanced and more water can be provided to seep the soil and satisfy the plants requiring more water. The length of the water-level control tube can be adjusted according to water demand of the plants.

What is claimed is:

1. A stagger stacked flowerpot system, comprising:
a plurality of flowerpot bodies (1) arranged in an array in a stagger way; wherein each of the plurality of flowerpot bodies (1) contains a seedling pot (7) or a soil baffle (2), each of the plurality of flowerpot bodies (1) including a cavity for receiving the seedling pot (7) or the soil baffle (2), a water storage space (16) formed at an inner bottom portion of the each of the plurality of flowerpot bodies (1), a snap groove (9) formed on a middle portion of an outside surface of the bottom of the each of the plurality of flowerpot bodies (1), the each of the plurality of flowerpot bodies (1) including a back planar portion abut against a wall and a front curve portion matching a shape of the seedling pot (7) or the soil baffle (2), the front curve portion having an curved upper edge, end portions of the curved upper edges between two adjacent flowerpot bodies forming a joint portion, the snap groove (9) formed on each flowerpot body arranged to clamp the joint portion, a drain hole (6) arranged at the bottom of the each of the plurality of flowerpot bodies (1) and arranged away from the middle portion of the bottom of the each of the plurality of flowerpot bodies (1), the drain hole (6) is as high as a maximum water level in the water storage space (6), and water in the water storage space (16) overflowing out from the drain hole (6) and then flowing into the water storage space of a flowerpot body (1) arranged at a lower level.

2. The stagger stacked flowerpot system according to claim 1, wherein a top part of each of the plurality of flowerpot bodies (1) projects out with a predefined angle such that a barycenter of the seedling pot (7) is within the range of a bottom diameter of the seedling pot (7).

3. The stagger stacked flowerpot system according to claim 1, further comprising a front bracing (4) and a rear bracing (5) arranged in the bottom portion of the each of the plurality of flowerpot bodies (1) to brace the seedling pot (7) or the soil baffle (2).

4. The stagger stacked flowerpot system according to claim 3, wherein a rear bracing sleeve (17) is arranged at the bottom of the soil baffle (2) and is sleeved on the rear bracing (5).

5. The stagger stacked flowerpot system according to claim 4, wherein after the rear bracing sleeve (17) is arranged in the each of the plurality of flowerpot bodies (1), the peripheral wall of the rear bracing sleeve fits in with the inner wall of the each of the plurality of flowerpot bodies (1); and the back wall of the rear bracing sleeve (17) partially warps up, so that the upwarped part and the inner wall of the each of the plurality of flowerpot bodies (1) jointly form a water groove (12), through which water flows into the water storage space (16).

* * * * *